US012801378B2

(12) United States Patent
Matz et al.

(10) Patent No.: US 12,801,378 B2
(45) Date of Patent: Nov. 17, 2026

(54) SYSTEMS AND METHODS FOR RECONCILING SOFTWARE RELEASE SCOPE REQUIREMENTS

(71) Applicant: JPMORGAN CHASE BANK, N.A., New York, NY (US)

(72) Inventors: Steven Matz, Northbrook, IL (US); Rassamay Sopha, Chicago, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 258 days.

(21) Appl. No.: 18/597,467

(22) Filed: Mar. 6, 2024

(65) Prior Publication Data

US 2025/0284487 A1 Sep. 11, 2025

(51) Int. Cl.
*G06F 8/71* (2018.01)
*G06F 11/3668* (2025.01)

(52) U.S. Cl.
CPC .............. *G06F 8/71* (2013.01); *G06F 11/368* (2013.01)

(58) Field of Classification Search
CPC ................................................... G06F 8/71–73
See application file for complete search history.

(56) References Cited

U.S. PATENT DOCUMENTS

2020/0285462 A1* 9/2020 Sabath ...................... G06F 8/33
2021/0271466 A1* 9/2021 Sridhara ............... G06F 40/205
2022/0012069 A1* 1/2022 Verma ................. G06F 11/3438
2023/0393825 A1* 12/2023 Bandaru ................... G06F 8/60
2024/0086183 A1* 3/2024 Avila ........................ G06F 8/71
2024/0338309 A1* 10/2024 Wilson ...................... G06F 8/65

FOREIGN PATENT DOCUMENTS

CN 111857796 A * 10/2020 ............... G06F 8/71

* cited by examiner

*Primary Examiner* — Ziaul A Chowdhury
(74) *Attorney, Agent, or Firm* — GREENBERG TRAURIG LLP

(57) ABSTRACT

Systems and methods for reconciling software release scope requirements are disclosed. A method may include: identifying code release version for a release candidate codebase; retrieving a log of changes made to the release candidate codebase and an implemented requirements identifier for each change; retrieving planned requirements identifiers for the code release version from a code requirements database; comparing the implemented requirements identifiers and the planned requirements identifiers; determining, based on the comparison, that an out-of-scope code change is included in the code release version; reverting the code release version to a prior version of the release candidate codebase that does not include the out-of-scope code change; retaining or reapplying in-scope code changes for the planned requirement identifiers to the prior version of the release candidate codebase; and deploying the prior version of the release candidate codebase with the in-scope changes to a production environment.

10 Claims, 5 Drawing Sheets

SYSTEMS AND METHODS FOR RECONCILING SOFTWARE RELEASE SCOPE REQUIREMENTS

BACKGROUND OF THE INVENTION

1. Field of the Invention

Embodiments are generally directed to systems and methods for reconciling software release scope requirements.

2. Description of the Related Art

During the software release process, when code is being promoted to a production environment, the release manager or deployment authority currently has no systematic way of knowing whether all changes in the code are intended for that specific release version, or whether any planned requirements are missing. Thus, it is possible for unintended changes to be included in the release, or for some planned feature enhancements to be omitted from the release. This presents a critical change management risk, which may result in untested features being released, or possible breaking changes that any partner services have not made corresponding updates to support.

SUMMARY OF THE INVENTION

Systems and methods for reconciling software release scope requirements are disclosed. According to an embodiment, a method may include: (1) identifying, by a computer program, a code release version for a release candidate codebase; (2) retrieving, by the computer program, a log of changes made to the release candidate codebase and an implemented requirements identifier for each change; (3) retrieving, by the computer program, planned requirements identifiers for the code release version from a code requirements database; (4) comparing, by the computer program, the implemented requirements identifiers and the planned requirements identifiers; (5) determining, by the computer program and based on the comparison, that an out-of-scope code change is included in the code release version; (6) reverting, by the computer program, the code release version to a prior version of the release candidate codebase that does not include the out-of-scope code change; (7) retaining or reapplying, by the computer program, in-scope code changes for the planned requirement identifiers to the prior version of the release candidate codebase; and (8) deploying, by the computer program, the prior version of the release candidate codebase with the in-scope changes to a production environment.

In one embodiment, the method may also include resolving, by the computer program, conflicts in the prior version of the release candidate codebase with the in-scope changes.

In one embodiment, the method may also include performing, by the computer program, regression and integration tests on the prior version of the release candidate codebase with the in-scope changes.

According to another embodiment, a method may include: (1) identifying, by a computer program, a code release version for a release candidate codebase; (2) retrieving, by the computer program, a log of changes made to the release candidate codebase and an implemented requirements identifier for each change; (3) retrieving, by the computer program, planned requirements identifiers for the code release version from a code requirements database; (4) comparing, by the computer program, the implemented requirements identifiers and the planned requirements identifiers; (5) identifying, by the computer program and based on the comparison, a missing in-scope code change that is not included in the code release version; (6) receiving, by the computer program, a requirement description, acceptance criteria, and implementation prompts for the missing in-scope change; (7) generating, by the computer program, code to implement the missing in-scope change using the requirement description for the missing in-scope change, the acceptance criteria, and the implementation prompts; (8) creating, by the computer program, a code merge request to merge the code to implement the missing in-scope change with the code release version; and (9) deploying, by the computer program, the merged code to a production environment.

In one embodiment, the computer program further receives an identification of impacted software components impacted by implementing the missing in-scope change.

In one embodiment, the impacted software components implement the missing in-scope change.

In one embodiment, the requirement description and the acceptance criteria identify a desired outcome for implementing the missing in-scope change.

In one embodiment, the code to implement the missing in-scope change is generated using an artificial intelligence engine and a large language model.

According to another embodiment, a non-transitory computer readable storage medium may include instructions stored thereon, which when read and executed by one or more computer processors, cause the one or more computer processors to perform steps comprising: identifying a code release version for a release candidate codebase; retrieving a log of changes made to the release candidate codebase and an implemented requirements identifier for each change; retrieving planned requirements identifiers for the code release version from a code requirements database; comparing the implemented requirements identifiers and the planned requirements identifiers; determining, based on the comparison, that an out-of-scope code change is included in the code release version; reverting the code release version to a prior version of the release candidate codebase that does not include the out-of-scope code change; retaining or reapplying in-scope code changes for the planned requirement identifiers to the prior version of the release candidate codebase; identifying, based on the comparison, a missing in-scope code change that is not included in the code release version; receiving a requirement description, acceptance criteria, and implementation prompts for the missing in-scope change; generating code to implement the missing in-scope change using the requirement description for the missing in-scope change, the acceptance criteria, and the implementation prompts; creating a code merge request to merge the code to implement the missing in-scope change with the prior version of the release candidate codebase with the in-scope changes to a production environment; and deploying the merged code to a production environment.

In one embodiment, the non-transitory computer readable storage medium may also include instructions stored thereon, which when read and executed by one or more computer processors, cause the one or more computer processors to resolve conflicts in the prior version of the release candidate codebase with the in-scope changes.

In one embodiment, the non-transitory computer readable storage medium may also include instructions stored thereon, which when read and executed by one or more computer processors, cause the one or more computer processors to perform regression and integration tests on the prior version of the release candidate codebase with the in-scope changes.

In one embodiment, the computer program further receives an identification of impacted software components impacted by implementing the missing in-scope change.

In one embodiment, the impacted software components implement the missing in-scope change.

In one embodiment, the requirement description and the acceptance criteria identify a desired outcome for implementing the missing in-scope change.

In one embodiment, the code to implement the missing in-scope change is generated using an artificial intelligence engine and a large language model.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Systems and methods for reconciling software release scope requirements are disclosed.

Embodiment may include retrieving data from a software configuration management (SCM) system and a requirements tracking system, performing a reconciliation between the two data sets, and automatically fixing discrepancies by either reverting code changes or generating new code changes.

Embodiments may provide a systematic method for a release manager to determine whether changes and requirements are in alignment before completing the release, thereby significantly reducing critical change management risks.

Embodiments may include connecting to a SCM system to retrieve all code updates made in a codebase being promoted for release. The intended release version and metadata for each code change in that codebase may be processed to extract the requirements identifier.

As used herein, a "codebase" may be a collection of source code used to build a software component, application, or system. In addition to the computer software instructions, it may include configurations and properties that effect the software behavior or functionality.

Next, a connection to a requirements tracking system may be made to retrieve all in-scope requirements, including the requirement identifiers, associated to that release version.

The validation process may then reconcile the list of requirements in scope for a release with a set of requirements associated with the same release in the SCM system. For example, the reconciler may handle the following scenarios: (1) for requirements missing from the release candidate code, a coding engine may generate the code based on the prompts defined for the requirements identifier and create a new code merge request for review and approval; (2) for extraneous requirements included in the release candidate code, the coding engine may revert the changes and create a code merge request for review and approval; (3) for matching requirements between code and release requirements, no action may be taken.

The deployment authority or release manager may review and determine if the reconciliation fixes are acceptable and may then proceed to production release. Programmatic tollgate processes may be used to prevent erroneous releases.

Figure 1:
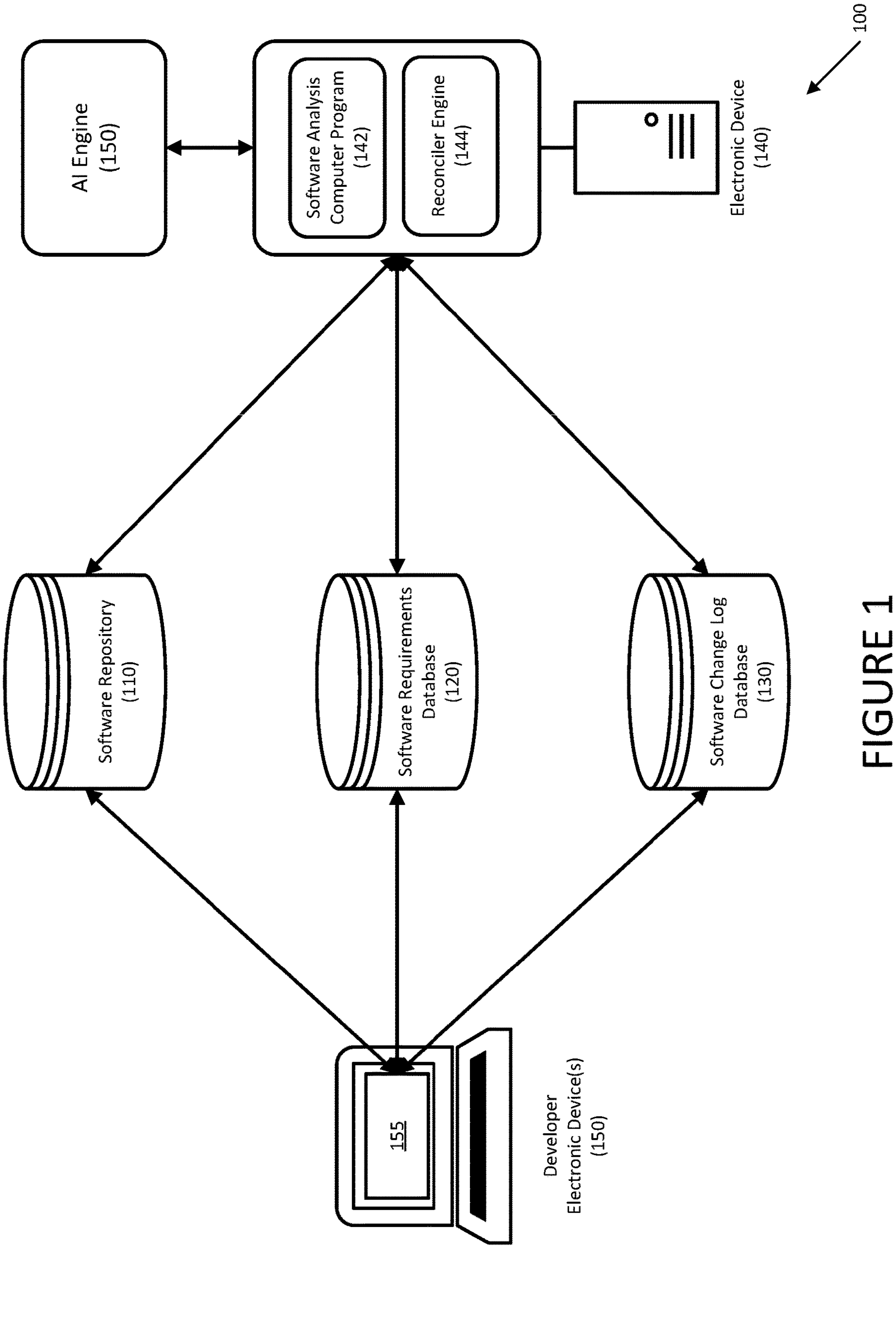
FIG. 1 depicts a system for reconciling software release scope requirements according to an embodiment.

Referring to FIG. 1, a system for reconciling software release scope requirements is disclosed according to an embodiment. System 100 may include software repository 110, software requirements database 120, software change log database 120, electronic device 140 executing software analysis computer program 142 and reconciler engine 144, and developer electronic device(s) 150 executing software developer computer programs 155.

Software repository 110 may maintain code for software, such as computer applications, computer system configurations, infrastructure provisioning instructions, and other computer related instructions. Software requirements database 120 may maintain a list of requirements to be implemented in each software release. Software change log database 130 may maintain a record of requirements implemented in each software release by developers using developer electronic devices 150 and developer computer programs 155.

Software analysis computer program 142 may analyze software in software repository 110 to identify any changes that were made that are outside of the scope of the current release, as well as any in-scope requirements that were not implemented. For example, software analysis computer program 142 may use requirements from software requirements database 120 and the logs in software change log database 130 to assess the state of the changes in the software.

Depending on the outcome of the analysis, reconciler engine 144 may, for example, revert the code to a previous version in response to an out-of-scope requirement being implemented, or may generate code to implement any missing requirements and merge the new code with the existing code.

System 100 may further include artificial intelligence (AI) engine 160 that may be used to generate code for any missing requirements. In one embodiment, AI engine 160 may be a generative AI built on top of a large language model (LLM). The LLM may be fully trained on the codebase and a requirements database for an organization, or it may be a pre-trained base LLM that may be fine-tuned on the organization's existing software codebase and requirements data. In embodiments, the LLM may be multi-modal and may accept an image of the requirement's system design diagram as input to inform the code generation.

Once the code is updated, the code may be deployed to a production environment (not shown).

Figure 2A:
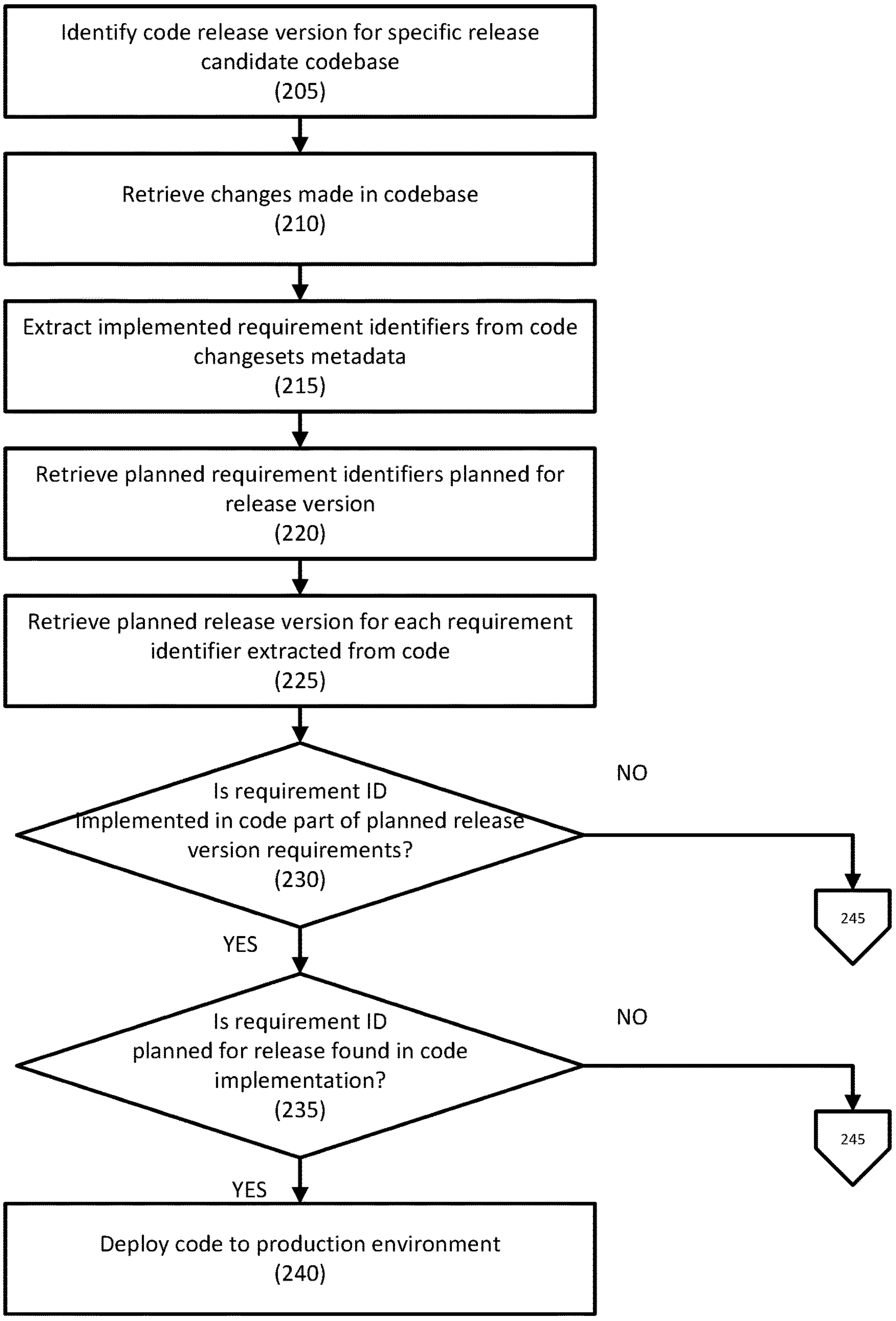
FIGS. 2A, 2B, and 2C depict a method for reconciling software release scope requirements according to an embodiment.
Figure 2B:
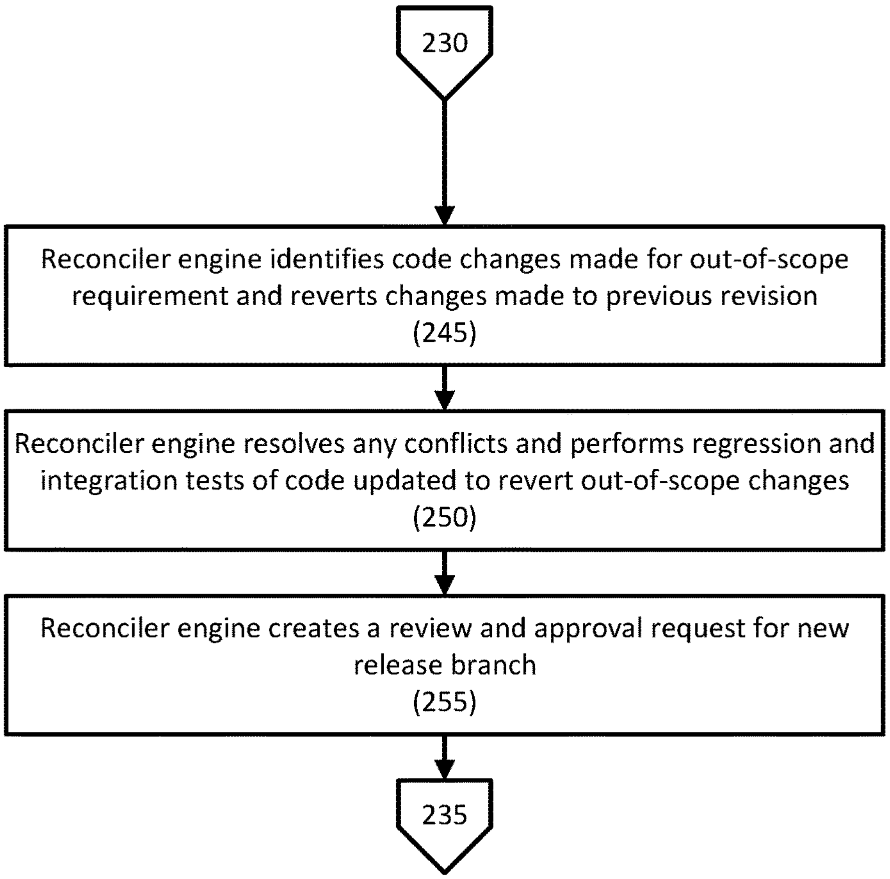
Figure 2C:
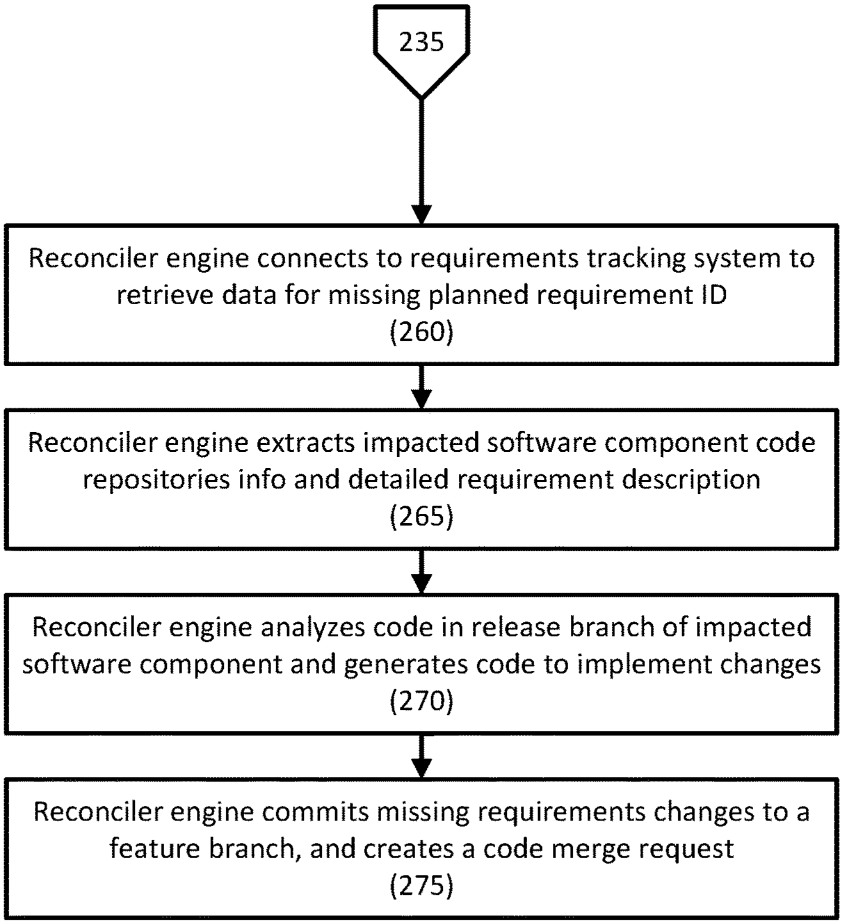

Referring to FIGS. 2A, 2B, and 2C, a method for reconciling software release scope requirements is disclosed according to an embodiment.

In step 205, a computer program, such as a software analysis computer program, may identify a code release version for a specific release candidate codebase. For example, the code release version may be identified for code that is going to be deployed to production environment.

In step 210, the computer program may retrieve a list of changes made to the codebase. For example, the computer program may access a change log database of changes made to the code. Each code change may identify the change that was made in the current version of the code. It may also include an identifier for the implemented requirement.

In step 215, if not already provided, the computer program may extract requirement identifiers from the metadata from the change log metadata. For example, the computer program may further analyze the code changes associated with the requirement identifiers to determine if it was to revert/undo or to implement the code requirements.

In step 220, the computer program may retrieve requirement identifiers for code that is planned to be included in the release version from a code requirements database. For example, a plurality of code blocks or files may be included in a code release. In one embodiment, each release version may identify the planned requirement identifiers for that release.

In step 225, the computer program may retrieve the planned release version for each requirement identifier from the requirements management system.

In step 230, the computer program may check to see if implemented requirement identifier that is implemented in the code is included in the planned release version requirements for the code. If there are implemented requirement identifiers that are included that are not part of the planned release version that are included, the process may continue to step 245.

In step 245, a reconciler engine may identify the code changes that are included for out-of-scope requirements and may revert the code to a previous version that did not include the change(s). The reconciler engine may retain or reapply in-scope requirements code changes while retaining the linkage(s) to the original associated requirements identifiers for each change increment.

In step 250, the reconciler engine may resolve any conflicts and may perform regression and integration tests of the updated code.

In step 255, the reconciler engine may save the updates performed to a new codebase and may create a review and approval request for the updated code to be merged back into the release codebase. The process may then return to step 235.

In step 235, the computer program may then check to see if all planned requirement identifiers for the planned release are present in the code. If they are not, in step 260, the reconciler engine may connect to a requirements tracking system to retrieve data for any missing planned requirement identifiers. This ensures that all requirements planned for the release are included in the code changes.

In step 265, the reconciler engine may extract information for repositories with impacted software components, a detailed requirement description, acceptance criteria, and any implementation prompts from the data of the missing requirement identifiers. The impacted software component may be components where artificial intelligence may ensure that the requirement(s) are implemented. The requirement description and acceptance criteria identify the desired outcome for that requirement that an artificial intelligence engine will try to achieve. Implementation prompts are hints or guidelines for how an AI engine should implement the requirement.

In step 270, the reconciler engine may analyze code in release codebase of an impacted software component and may use the requirement description, acceptance criteria, and implementation prompts to generate code to implement the changes for the missing requirement identifier. For example, the reconciler engine may provide the impacted software components, the detailed requirement description, the acceptance criteria, and the implementation prompts to an AI engine, and the AI engine may generate code for the missing requirement identifier.

In one embodiment, the AI engine may use a multi-modal LLM that has been trained or fine-tuned on the organization's full existing codebase and historical requirements data. For example, the AI engine may provide all requirements details extracted as input to the LLM in order to generate code that is informed by the computer application's system design, impacted software component's current features, and organization's coding style.

In step 275, the reconciler engine may commit any missing requirements changes to a feature codebase, and creates a code merge request so that the code may be merged with the existing code. The process may then proceed with step 240.

In step 240, the code may then be deployed to a production environment.

Figure 3:
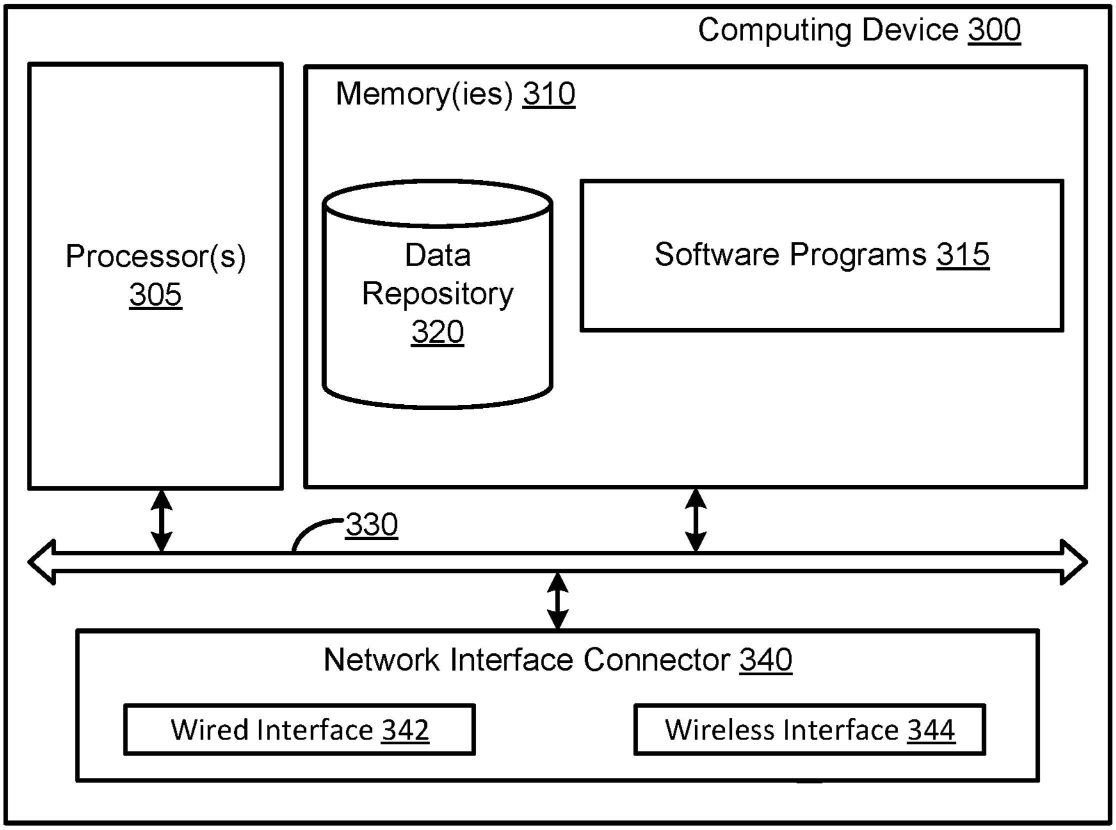
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer.

However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

identifying, by a computer program, a code release version for a release candidate codebase;

retrieving, by the computer program, a log of changes made to the release candidate codebase and an implemented requirements identifier for each change;

retrieving, by the computer program, planned requirements identifiers for the code release version from a code requirements database;

comparing, by the computer program, the implemented requirements identifiers and the planned requirements identifiers;

determining, by the computer program and based on the comparison, that an out-of-scope code change is included in the code release version;

reverting, by the computer program, the code release version to a prior version of the release candidate codebase that does not include the out-of-scope code change in response to determining that there is the out-of-scope code change in the code release version;

retaining or reapplying, by the computer program, in-scope code changes for the planned requirement identifiers to the prior version of the release candidate codebase;

resolving, by the computer program, conflicts in the prior version of the release candidate codebase with the in-scope code changes;

performing, by the computer program, regression and integration tests on the prior version of the release candidate codebase with the in-scope code changes; and deploying, by the computer program, the prior version of the release candidate codebase with the in-scope code changes to a production environment.

2. A method, comprising:

identifying, by a computer program, a code release version for a release candidate codebase;

retrieving, by the computer program, a log of changes made to the release candidate codebase and an implemented requirements identifier for each change;

retrieving, by the computer program, planned requirements identifiers for the code release version from a code requirements database;

comparing, by the computer program, the implemented requirements identifiers and the planned requirements identifiers;

identifying, by the computer program and based on the comparison, a missing in-scope code change that is not included in the code release version;

receiving, by the computer program, a requirement description, acceptance criteria, and implementation prompts for the missing in-scope code change in response to determining that there is the missing in-scope code change in the code release version, wherein the requirement description and the acceptance criteria identify a desired outcome for implementing the missing in-scope code change;

generating, by the computer program, code to implement the missing in-scope code change using the requirement description for the missing in-scope code change, the acceptance criteria, and the implementation prompts;

creating, by the computer program, a code merge request to merge the code to implement the missing in-scope code change with the code release version; and deploying, by the computer program, the merged code to a production environment.

3. The method of claim 2, wherein the computer program further receives an identification of impacted software components impacted by implementing the missing in-scope code change.

4. The method of claim 3, wherein the impacted software components implement the missing in-scope code change.

5. The method of claim 2, wherein the code to implement the missing in-scope code change is generated using an artificial intelligence engine and a large language model.

6. A non-transitory computer readable storage medium, including instructions stored thereon, which when read and executed by one or more computer processors, cause the one or more computer processors to perform steps comprising:

identifying a code release version for a release candidate codebase;

retrieving a log of changes made to the release candidate codebase and an implemented requirements identifier for each change;

retrieving planned requirements identifiers for the code release version from a code requirements database;

comparing the implemented requirements identifiers and the planned requirements identifiers;

determining, based on the comparison, that an out-of-scope code change is included in the code release version;

reverting the code release version to a prior version of the release candidate codebase that does not include the out-of-scope code change in response to determining that there is the out-of-scope code change in the code release version;

retaining or reapplying in-scope code changes for the planned requirement identifiers to the prior version of the release candidate codebase;

identifying, based on the comparison, a missing in-scope code change that is not included in the code release version;

receiving a requirement description, acceptance criteria, and implementation prompts for the missing in-scope code change;

generating code to implement the missing in-scope code change using the requirement description for the missing in-scope code change, the acceptance criteria, and the implementation prompts;

creating a code merge request to merge the code to implement the missing in-scope code change with the prior version of the release candidate codebase with the in-scope code changes to a production environment;

resolving conflicts in the prior version of the release candidate codebase with the in-scope code changes;

performing regression and integration tests on the prior version of the release candidate codebase with the in-scope code changes; and deploying the merged code to a production environment.

7. The non-transitory computer readable storage medium of claim 6, further comprising receiving an identification of impacted software components impacted by implementing the missing in-scope code change.

8. The non-transitory computer readable storage medium of claim 7, wherein the impacted software components implement the missing in-scope code change.

9. The non-transitory computer readable storage medium of claim 6, wherein the requirement description and the acceptance criteria identify a desired outcome for implementing the missing in-scope code change.

10. The non-transitory computer readable storage medium of claim 6, wherein the code to implement the missing in-scope code change is generated using an artificial intelligence engine and a large language model.

* * * * *